(12) United States Patent
Liberty

(10) Patent No.: US 7,788,546 B2
(45) Date of Patent: Aug. 31, 2010

(54) METHOD AND SYSTEM FOR IDENTIFYING COMMUNICATION ERRORS RESULTING FROM RESET SKEW

(75) Inventor: Dean A. Liberty, Nashua, NH (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 462 days.

(21) Appl. No.: 11/856,589

(22) Filed: Sep. 17, 2007

(65) Prior Publication Data

US 2009/0077426 A1    Mar. 19, 2009

(51) Int. Cl.
*G06F 11/00* (2006.01)
(52) U.S. Cl. ...................................... 714/48
(58) Field of Classification Search ............. 714/25–27, 714/30–33, 39, 40, 47–49, 52, 57
See application file for complete search history.

(56) References Cited

U.S. PATENT DOCUMENTS

| | | | | |
|---|---|---|---|---|
| 5,214,784 | A * | 5/1993 | Ward et al. | 714/39 |
| 5,231,638 | A * | 7/1993 | Fujiki | 714/765 |
| 5,423,025 | A * | 6/1995 | Goldman et al. | 714/57 |
| 6,336,193 | B1 * | 1/2002 | Yudenfriend et al. | 714/15 |
| 6,684,353 | B1 * | 1/2004 | Parker et al. | 714/718 |
| 7,320,091 | B2 * | 1/2008 | Blaauw et al. | 714/30 |
| 7,350,007 | B2 * | 3/2008 | Depew et al. | 710/267 |
| 7,523,359 | B2 * | 4/2009 | Richards et al. | 714/49 |
| 7,624,305 | B2 * | 11/2009 | De Araujo et al. | 714/25 |
| 2005/0246613 | A1 * | 11/2005 | Blaauw et al. | 714/763 |
| 2006/0230306 | A1 * | 10/2006 | Richards et al. | 714/7 |

* cited by examiner

*Primary Examiner*—Nadeem Iqbal

(57) ABSTRACT

An electronic system includes a counter and a first component. The first component includes a reset input configured to receive a reset event, an interface to a communications interface coupleable to a second component, an error detection module configured to initiate the counter in response to detecting an error in a first communication from the second component, and an event logging module. The event logging module is configured to store a first indicator representative of the counter value of the counter in response to receiving the reset event via the reset input and configured to store a second indicator representative of the error at the communications interface. The counter is initiated at the first component in response to detecting an error in a first communication from the second component. A counter value of the counter is determined in response to detecting a reset event at the first component subsequent to detecting the error in the first communication. A first indicator representative of the counter value and a second indicator representative of the error in the first communication is stored at the electronic system.

20 Claims, 3 Drawing Sheets

METHOD AND SYSTEM FOR IDENTIFYING COMMUNICATION ERRORS RESULTING FROM RESET SKEW

FIELD OF THE DISCLOSURE

The present disclosure relates generally to communications between electronic components and more particularly to identifying errors in communications between electronic components.

BACKGROUND

A reset operation for an electronic system typically is initiated by transmitting a reset indicator (e.g., a particular voltage level or bit vector) via a communications path that is routed to the appropriate electronic components of the system. However, propagation skew of the reset indicator typically is present due to various factors of the communications path and the electronic components, such as the relative distances of the electronic components relative to the initiation point of the reset indicator, the presence of logic (e.g., buffers) along the communications path between electronic components, and the like. Due to this reset propagation skew, those electronic components closer to the initiation point may already be well into their respective reset operations before electronic components further from the initiation point have received the reset indicator. Thus, the spurious activity on a communications path resulting from the processing of the reset indicator by a first electronic component closer to the initiation point of the reset indicator may appear as a communication error to a second electronic component further away from the initiation point because the second electronic component had not yet become aware of the reset event. An analysis of the error events logged by the second electronic component therefore may give the false impression that the first electronic component was operating erratically, where in actuality the first electronic component was correctly processing the reset indicator. Accordingly, a technique for identifying communication errors resulting from reset propagation skew would be advantageous.

BRIEF DESCRIPTION OF THE DRAWINGS

The purpose and advantages of the present disclosure will be apparent to those of ordinary skill in the art from the following detailed description in conjunction with the appended drawings in which like reference characters are used to indicate like elements, and in which.

DETAILED DESCRIPTION OF THE DISCLOSURE

The following description is intended to convey a thorough understanding of the present disclosure by providing a number of specific embodiments and details involving logging of errors in communications between electronic components. It is understood, however, that the present disclosure is not limited to these specific embodiments and details, which are exemplary only. It is further understood that one possessing ordinary skill in the art, in light of known systems and methods, would appreciate the use of the disclosure for its intended purposes and benefits in any number of alternative embodiments, depending upon specific design and other needs.

FIGS. 1-7 illustrate exemplary techniques for logging error events in communications between electronic components and identifying those error events that likely resulted from a reset propagation delay between the electronic components. In one embodiment, a first electronic component monitors communications from at least a second electronic component. In the event that a communication error is detected, the first electronic component initiates a timer (if not already initiated). In the event a reset indicator is received, the value of the timer when the reset indicator was received is logged. The logged events then can be analyzed to determine whether the communication error was likely an actual error or likely is an artifact resulting from a reset operation at the second electronic component. The communication error can be identified as a reset artifact when the logged timer value for receipt of the reset indicator is less than a predetermined threshold value; otherwise, the communication error can be identified as an actual communication error. In one embodiment, the predetermined threshold value represents an expected reset propagation delay between the second electronic component and the first electronic component.

For ease of illustration, the techniques are described herein in the context of two electronic components. However, these techniques can be utilized for logging error events between more than two electronic components using the guidelines provided herein without departing from the scope of the present disclosure.

Figure 1:
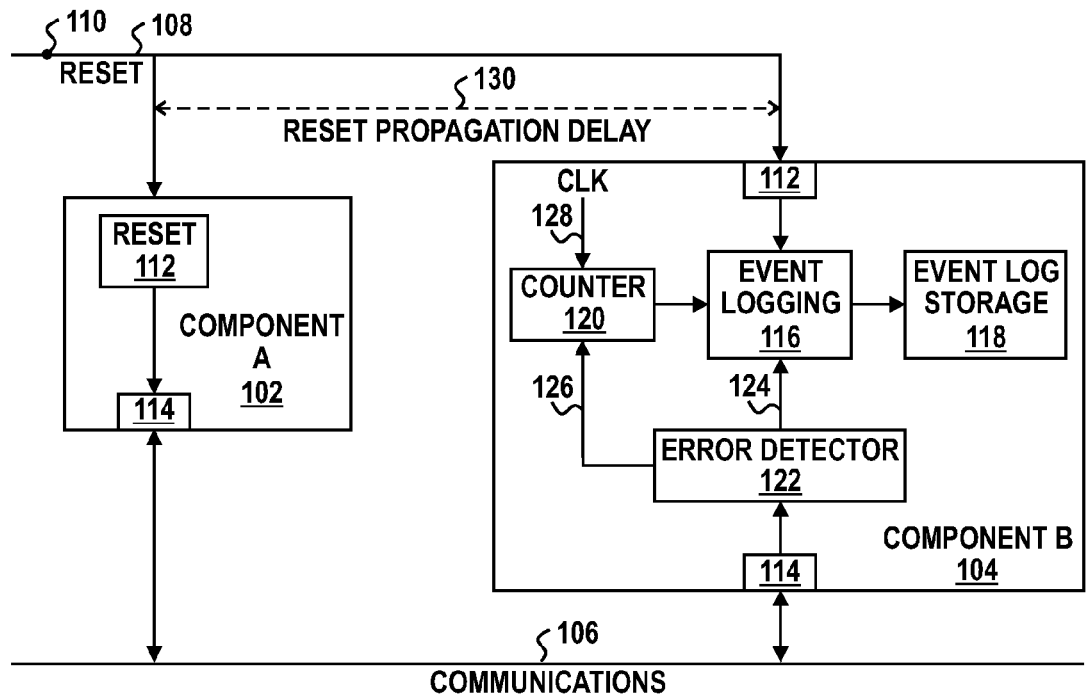
FIG. 1 is a block diagram illustrating a system comprising two electronic components in communication in accordance with at least one embodiment of the present disclosure.

FIG. 1 illustrates an electronic system 100 configured to log communication errors in accordance with at least one embodiment of the present disclosure. The electronic system 100 includes a plurality of electronic components, such as electronic component 102 and electronic component 104 (also identified herein as "component A" and "component B," respectively). The plurality of electronic components can include, for example, separate devices (e.g., separate processors), different components within the same device (e.g., different components within the same processor), or a combination thereof. The plurality of electronic components can communicate data via at least one communications path 106, which can comprise, for example, bus, a switch, a bridge, or a combination thereof. Further, each electronic component includes an input to receive a reset indicator via a reset distribution path 108, which can comprise, for example, one or more conductive interconnects routed between the plurality of electronic components. The reset distribution path 108 can be implemented as part of the communications path 106, or implemented separately. The reset indicator is initially supplied for distribution along the reset distribution path 108 at initiation point 110, which is closer, from a propagation-perspective, to the electronic component 102 than the electronic component 104. The reset indicator can include, for example, a particular asserted voltage level (e.g., a voltage associated with a logic "1" value), a packet or a vector comprising a certain set of bit values, etc.

In the depicted example, the electronic component 104 includes a reset interface 112 connected to the reset distribution path 108, a communications interface 114 connected to the communications path 106, an event logging module 116, an event log storage 118, a counter 120, and an error detection module 122. The electronic component 102 can be similarly configured.

The event log storage 118 comprises a storage component utilized to store logged error events and reset events during the operation of the electronic component 104. The event log storage 118 can include, for example, a register file, a cache, random access memory (RAM), a hard disk drive, an optical disk drive, and the like. To illustrate, in one embodiment, the event log storage 118 includes one or more registers of a machine check architecture (MCA) register file. Operational events, such as communication error events and reset events, can be individually logged in the event log storage 118. Alternately, in one embodiment, an indicator that simply represents that an error occurred prior to receipt of a reset event without indicating the type of error can be stored at, for example, an MCA status register, whereby a bit position of the MCA status register can be used to indicate whether a reset event was received. In at least one embodiment, the contents of the event log storage 118 can be externally accessed (e.g., via scan-chain access, via register output to an input/output device, or via an IEEE 1149.1-compliant test interface) and the logged events can be analyzed to analyze the operation of certain components of the electronic system 100.

The error detection module 122 is configured to monitor the communications path 106 via the communications interface 114 in order to detect communication errors on the communications path 106 caused by other electronic components, such as the electronic component 102. The communication errors can include, for example, errors in packets transmitted via the communications path 106, such as link protocol errors, cyclical redundancy check (CRC) errors, error correcting code (ECC) errors, fields having reserved values, and the like. In response to detecting a communication error, the error detection module 122 is configured to provide an error indicator 124 to the event logging module 116. The error indicator 124 includes information regarding the detected communication error, such as the type of error, a packet identifier of the packet in which the error was detected, a time value indicating the time of receipt of the error at the communications interface 114, etc. Also in response to detecting the communication error, the error detection module 122 initiates the counter 120 by transmitting an initiation indicator 126. If the counter 120 hasn't already been initiated, the counter 120 responds to the initiation indicator 126 by starting the incrementation (or alternately decrementation) of its counter value based on cycles of a clock (CLK) signal 128.

In addition to logging communication errors detected by the error detection module 122, the event logging module 116 monitors the reset distribution path 108 via the reset interface 112 to detect receipt of a reset indicator. In the event that a reset indicator is received, the error event logging module 116 logs information regarding the reset event at the event storage log 118. In one embodiment, this information includes the counter value of the counter 120 at the time that the reset indicator was received, and thus the event logging module 116 is configured to access the counter 120 to obtain its current counter value in response to detecting the receipt of a reset indicator. Thus obtained, the current counter value can be supplied to the event log storage 118 for association with the received reset indicator.

At some point during or after an operation of the electronic system 100, the events logged at the event log storage 118 can be accessed to analyze the operation of the electronic system 100. However, due to a reset propagation delay 130 between when the electronic component 102 receives a reset indicator and initiates its reset operation and when the electronic component 104 receives the reset indicator and initiates its reset operation, spurious activity on the communications path 106 caused by the reset operation at the electronic component 102 may be erroneously detected and logged as one or more communication errors at the electronic component 104 because the electronic component 104 was not yet aware of the reset event at the time the spurious activity is detected. Accordingly, in one embodiment, the counter value obtained from the counter 120 and logged when the reset indicator finally is received at the electronic component 104 can be used to identify those communication errors that likely were a result of the reset operation at the electronic component 102. As discussed above, the identification of a communication error starts the counter 120 (if not already started) and the value of the counter 120 is subsequently logged when reset indicator is received. Thus, the counter value represents the time lapse between the purported communication error and the receipt of the reset indicator. To determine whether the communication error is in fact an actual error or merely an artifact of the processing of the reset indicator at the electronic component 102, the counter value (representing the time lapse) is compared with a threshold value (which can represent the reset propagation delay 130). In the event that the counter value exceeds the threshold value, it can be inferred that the communication error occurred prior to the receipt of the reset indicator at the electronic component 102 and thus is likely an actual communication error. Otherwise, in the event that the counter value does not exceed the threshold value, it can be interfered that the communication error occurred subsequent to the receipt of the reset indicator at the electronic component 102 and thus likely is an artifact of the processing of the reset indicator at the electronic component 102.

In one embodiment, the event logging module 122 can be configured to perform this comparison and edit the log of events accordingly. To illustrate, after receiving a reset indicator, the event logging module 116 can identify each logged communication error that was detected within the threshold value prior to receipt of the reset indicator and either mark these logged communication errors as communication errors related to processing of the reset indicator or delete them from the event log entirely. Conversely, those that were detected outside of the threshold value prior to receipt of the reset indicator can be marked as communication errors unrelated to processing of a reset indicator and maintained in the event log. Alternately, a technician or other user of the electronic system 100 can manipulate the log information obtained from the electronic component 104 so as to remove or discount likely reset artifacts for purposes of analyzing the operation of the electronic system 100.

Figure 2:
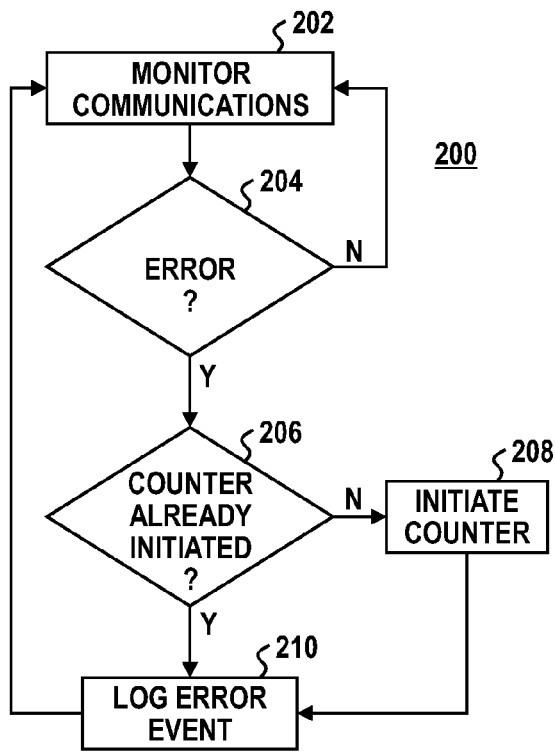
FIG. 2 is a flow diagram illustrating a method for logging an error event resulting from a communication from one electronic component to another electronic component in accordance with at least one embodiment of the present disclosure.

FIG. 2 illustrates an example method 200 for logging communication errors in accordance with at least one embodiment of the present disclosure. For ease of discussion, the method 200 is described in the context of the embodiment of the electronic component 104 of FIG. 1. At block 202, the error detection module 122 monitors the communications path 106 to determine whether any communication errors have occurred (block 204). In the event that a communication error has been detected, at block 206 the error detection module 122 determines whether the counter 120 already has been initiated. If not, at block 208 the error detection module 122 initiates the counter 120. At block 210, the error detection module 122 provides an error indicator 124 with the relevant information to the event logging module 116, which, in response, logs the communication error in the event log storage 118. The method 200 then can return to block 202 to monitor for the next communication error.

Figure 3:
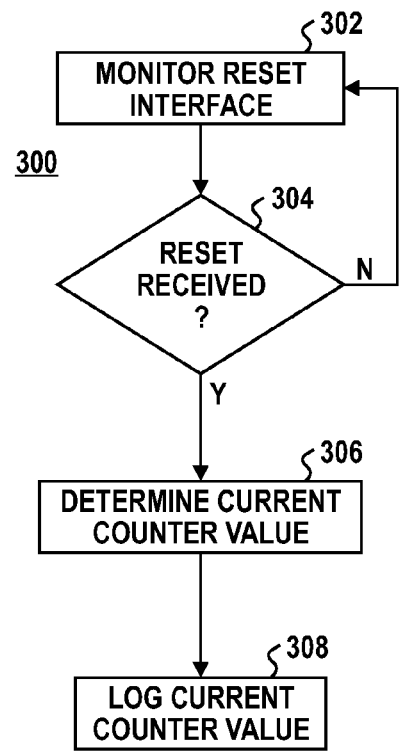
FIG. 3 is a flow diagram illustrating a method for logging a reset event at an electronic component in accordance with at least one embodiment of the present disclosure.

FIG. 3 illustrates an example method 300 for logging a reset event in accordance with at least one embodiment of the present disclosure. For ease of discussion, the method 300 is discussed in the context of the embodiment of the electronic component 104 of FIG. 1. At block 302, the event logging module 116 monitors the reset distribution path 108 via the reset interface 112 to determine whether a reset indicator has been received at the electronic component 104 (block 304). In the event a reset indicator is received, at block 306 the event logging module 116 accesses the counter 120 to determine the current counter value of the counter 120. At block 308, the event logging module 116 logs a reset event in the event log storage 118 along with the current counter value of the counter 120.

Figure 4:
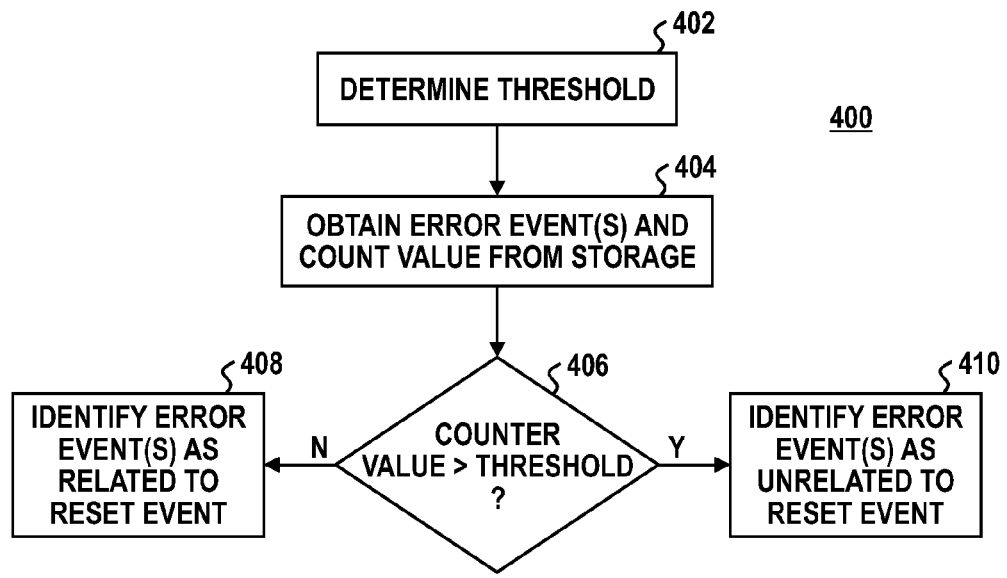
FIG. 4 is a flow diagram illustrating a method for determining whether an error event in a communication from an electronic component is related to a reset event in accordance with at least one embodiment of the present disclosure.

FIG. 4 illustrates an example method 400 for identifying communication errors related to reset events in accordance with at least one embodiment of the present disclosure. For ease of discussion, the method 400 is discussed in the context of the embodiment of the electronic component 104 of FIG. 1. At block 402, a threshold value representative of the reset propagation delay 130 between the electronic component 102 and the electronic component 104 is determined. To illustrate, assuming that the propagation delay 130 is estimated as 10 microseconds (us) and the clock signal 128 that drives the counter 120 has a frequency of 100 Megahertz (MHz), the threshold value could be determined to be approximately 100 ($100 \times 10^6$ cycles/second*0.000001 seconds). At block 404, the logged error events and reset events are obtained from the event log storage 118 via, for example, a Joint Test Action Group (JTAG) interface, a scan-chain, etc. At block 406, the counter value of the counter 120 obtained for a logged reset event is compared with the threshold value determined at block 402. In the event that the counter value does not exceed the threshold value, at block 408 the logged communication error that initiated the counter 120 and any subsequent logged communication errors occurring before the logged reset event are identified as related to the reset event and thus may be ignored or discounted when analyzing the operation of the electronic system 100 from the event log information. Otherwise, in the event that the counter value exceeds the threshold value, at block 410 the communication error that initiated the counter 120 is identified as unrelated to the reset event and thus can be utilized when analyzing the operation of the electronic system 100.

Figure 5:
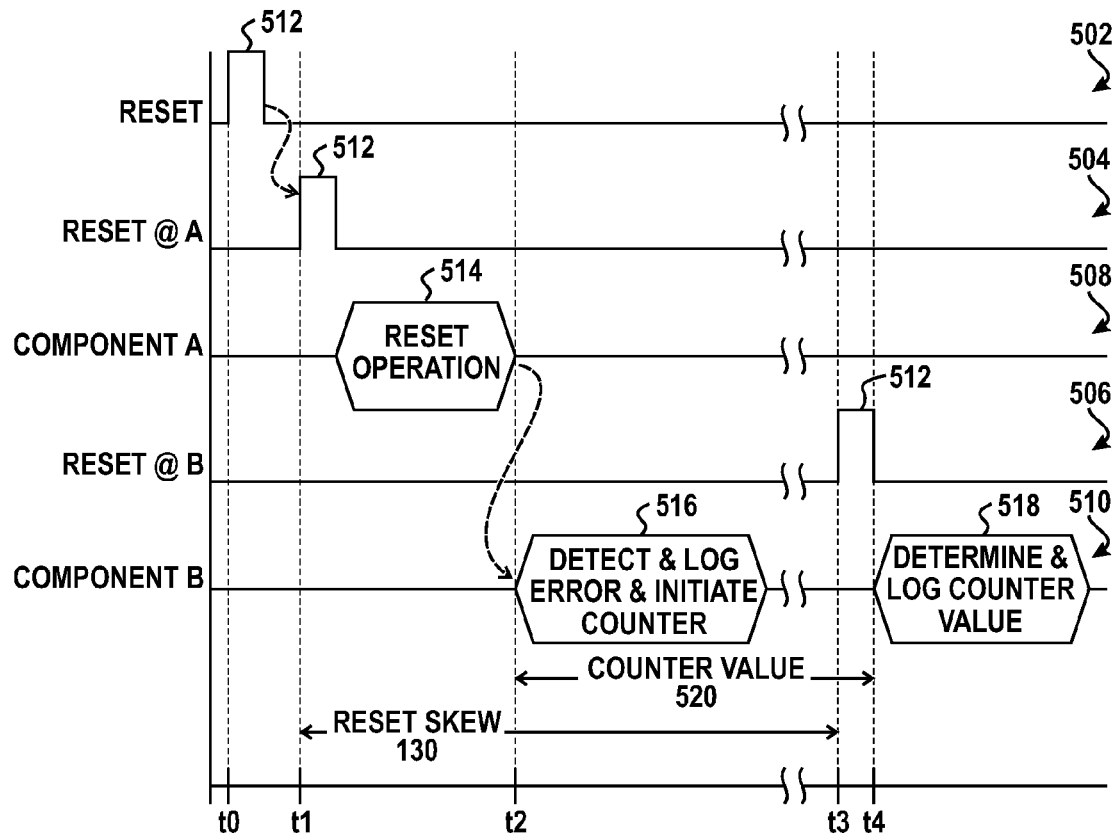
FIG. 5 is a diagram illustrating an example error event logging operation at an electronic component in accordance with at least one embodiment of the present disclosure.

FIG. 5 illustrates an example event logging operation of the electronic system 100 of FIG. 1 in accordance with at least one embodiment of the present disclosure. Graph line 502 represents the reset distribution path 108 at initiation point 110, graph line 504 represents the reset distribution path 108 at the input of the electronic component 102 (also identified as component A), graph line 506 represents the reset distribution path 108 at the input of the electronic component 104 (also identified as component B), graph line 508 represents the operation of the electronic component 102, and graph line 510 represents the operation of the electronic component 102.

In the depicted example, a reset indicator 512 (represented as a pulse) is supplied to the reset distribution path 108 at initiation point 110 at time $t_0$. The reset indicator 512 is received at the electronic component 102 and the electronic component 104 at times $t_1$ and $t_3$, respectively. Thus, the time lapse between times $t_1$ and $t_3$ represents the reset propagation skew 130 between the electronic components 102 and 104. In response to receiving the reset indicator 512 at time $t_1$, the electronic component 102 initiates a reset operation 514, which results in spurious manipulation of the communications interface of the electronic component 102 at time $t_2$, which in turn is detected and logged as a communication error by the electronic component 104 during log operation 516. As part of the log operation 516, the counter 120 is initiated at time $t_2$. At time $t_4$ the reset indicator is propagated to the electronic component 104, and in response, the electronic component 104 initiates a reset log operation 518 at time $t_4$, during which the current counter value 520 is accessed from the counter 120, where the current counter value 520 represents the number of clock cycles counted by the counter 120 between its initiation at time $t_2$ and its access at time $t_4$. In the event that the counter value 520 is less than a threshold value representing the reset propagation skew 130, the detected communication error can be identified as related to a reset event caused by the reset operation 514 at the electrical component 516. Otherwise, if the counter value exceeds the threshold value, the detected communication error can be identified as unrelated to the reset event.

Figure 6:
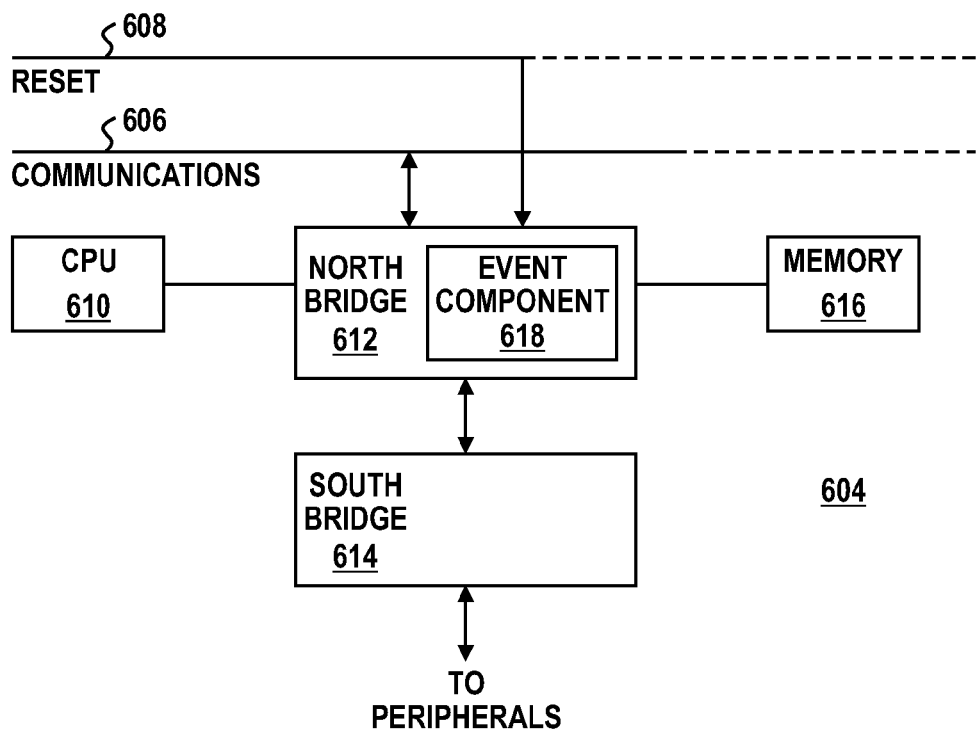
FIG. 6 is a block diagram illustrating a processor configured to log error events occurring in inter-processor communications in accordance with at least one embodiment of the present disclosure.

FIG. 6 illustrates an example implementation of the techniques of FIGS. 1-5 for logging inter-processor communication errors in accordance with at least one embodiment of the present disclosure. A processor 604 (corresponding to the electronic component 104 of FIG. 1) is connected to an inter-processor communications path 606 (corresponding to the communications path 106 of FIG. 1) and an inter-processor reset distribution path 608 (corresponding to the reset distribution path 108 of FIG. 1). The inter-processor communications path 606 and the inter-processor reset distribution path 108 further are connected to one or more other processors (not shown). The processor 604 includes a central processing unit (CPU) 610, a north bridge 612, a south bridge 614, a memory 616, and the like. In the depicted example, the north bridge 612 comprises event component 618, which collectively represents the event logging module 116, the event log storage 118, the counter 120, and the error detection module 122 of FIG. 1. The event component 618 alternately could be implemented at another component of the processor 604, such as the south bridge 614 or the CPU 610, or distributed among multiple components of the processor 604. In operation, the event component 618 monitors the inter-processor communications path 606 and the inter-processor reset distribution path 608 and logs any occurring communication errors by other processors and reset events using the techniques described above.

Figure 7:
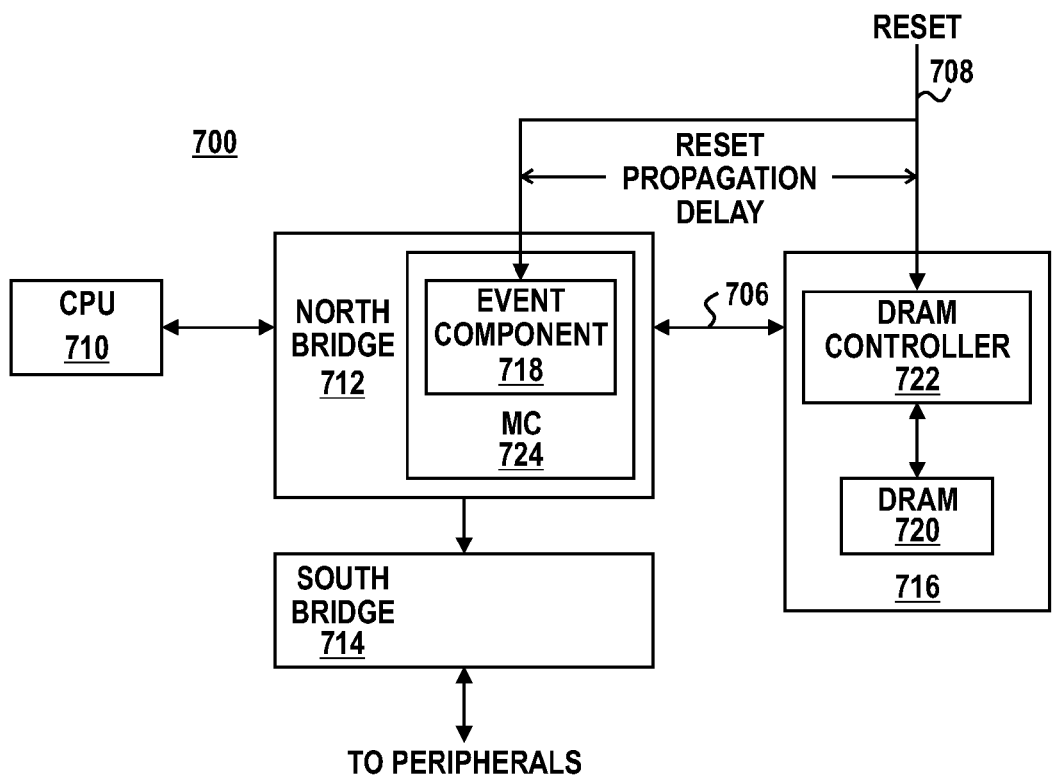
FIG. 7 is a block diagram illustrating a processor configured to log error events occurring in intra-processor communications in accordance with at least one embodiment of the present disclosure.

FIG. 7 illustrates an example implementation of the techniques of FIGS. 1-5 for logging intra-processor communication errors in accordance with at least one embodiment of the present disclosure. A processor 700 (corresponding to the electronic system 100 of FIG. 1) comprises an intra-processor communications path 706 (corresponding to the communications path 106 of FIG. 1) and an intra-processor reset distribution path 708 (corresponding to the reset distribution path 108 of FIG. 1). The processor 700 further comprises a CPU 710, a north bridge 712, a south bridge 714, a memory 716, and the like. The memory 716 includes a memory array, such as a dynamic random access memory (DRAM) array 720, and a memory array controller 722, such as a DRAM controller 722. The north bridge 712 includes a memory controller (MC) 724 for the memory 716, whereby the memory controller 724 implements an event component 718 (corresponding to the event logging module 116, the event log storage 118, the counter 120, and the error detection module 122 of FIG. 1). In the depicted example, the intra-processor communications path 706 communicates information between the memory controller 724 and the DRAM controller 722 and the intra-processor reset distribution path 708 distributes reset indicators to the memory controller 724 and the DRAM controller 722, as well as other components of the processor 700. In operation, the event component 718 monitors the intra-processor communications path 706 and the intra-processor reset distribution path 708 and logs any occurring communication errors from the DRAM controller 722 and reset events using the techniques described above.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
    initiating, at a first component of an electronic system, a counter in response to detecting an error in a first communication from a second component of the electronic system;
    adjusting a counter value of the counter responsive to a clock signal;
    determining the counter value of the counter in response to detecting a reset event at the first component subsequent to detecting the error in the first communication; and
    storing a first indicator representative of the counter value and a second indicator representative of the error in the first communication at the electronic system.

2. The method of claim 1, wherein the error in the first communication comprises one selected from a group consisting of: a link protocol error; a cyclic redundancy check (CRC) error; and an error correcting code (ECC) error.

3. The method of claim 1, further comprising:
    in the event that the counter value does not exceed a predetermined threshold, identifying the error in the first communication as related to a reset operation at the second component; and
    in the event that the counter value exceeds the predetermined threshold, identifying the error in the first communication as unrelated to a reset operation at the second component.

4. The method of claim 3, further comprising:
    determining the predetermined threshold based on an expected transmission skew of the reset event between the first component and the second component.

5. The method of claim 1, further comprising:
    detecting an error in a second communication from the second component, the second communication subsequent to the first communication; and
    storing a third indicator representative of the error in the second communication at the electronic system.

6. The method of claim 5, further comprising:
    in the event that the counter value does not exceed a predetermined threshold, identifying the error in the second communication as related to a reset operation at the second component; and
    in the event that the counter value exceeds the predetermined threshold, identifying the error in the second communication as unrelated to a reset operation at the second component.

7. The method of claim 1, wherein storing the first indicator and the second indicator comprises storing the first indicator and the second indicator in at least one machine check architecture (MCA) register associated with the first component.

8. The method of claim 1, wherein the first component comprises a first processor device of the electronic system and the second component comprises a second processor device of the electronic system.

9. The method of claim 1, wherein the first component comprises a memory controller of a processor device of the electronic system and the second component comprises a memory of the processor device.

10. A method comprising:
    receiving, at a first time, an indicator of a reset event at a first component of a processing system;
    initiating a reset operation at the first component in response to receiving the indicator of the reset event;
    receiving, at a second time subsequent to the first time, the indicator of the reset event at a second component of the processing system;
    detecting, at the first component at a third time prior to the second time, an error in a communication from the second component resulting from the reset operation at the first component; and
    identifying, at the first component, the error in the communication as related to the reset operation at the first component based on a comparison of a lapse between the third time and the second time to a predetermined threshold.

11. The method of claim 10, wherein identifying the error in the communication as related to the reset operation comprises:
    identifying the error in the communication as related to the reset operation in response to the lapse being less than the predetermined threshold; and
    identifying the error in the communication as unrelated to the reset operation in response to the lapse being greater than the predetermined threshold.

12. The method of claim 10, wherein the error comprises one selected from a group consisting of: a link protocol error; a cyclic redundancy check (CRC) error; and an error correcting code (ECC) error.

13. An electronic system comprising:
    a counter configured to adjust a counter value responsive to a clock signal;
    a first component comprising:
        a reset input configured to receive a reset event;
        an interface to a communications interface coupleable to a second component;
        an error detection module configured to initiate the counter in response to detecting an error in a first communication from the second component; and
        an event logging module configured to:
            store a first indicator representative of the counter value of the counter in response to receiving the reset event via the reset input; and
            store a second indicator representative of the error at the communications interface.

14. The electronic system of claim 13, wherein the error comprises one selected from a group consisting of: a link protocol error; a cyclic redundancy check (CRC) error; and an error correcting code (ECC) error.

15. The electronic system of claim 13, wherein:
the first component further comprises a set of machine check architecture (MCA) registers; and
the event logging module is configured to store the first indicator and the second indicator in the set of MCA registers.

16. The electronic system of claim 13, further comprising: the second component.

17. The electronic system of claim 16, wherein the first component comprises a first processor device and the second component comprises a second processor device.

18. The electronic system of claim 16, wherein the first component comprises a memory controller of a processor device and the second component comprises a memory of the processor device.

19. The electronic system of claim 16, wherein the second component comprises:
a reset interface configured to receive the reset event; and
a reset module configured to perform a reset operation in response to receiving the reset event via the reset interface.

20. The electronic system of claim 13, wherein:
the error detection module is further configured to detect an error in a second communication from the second component; and
the event logging module is further configured to store a third indicator representative of the error in the second communication.

* * * * *